(12) United States Patent
Das Sharma et al.

(10) Patent No.: US 11,657,015 B2
(45) Date of Patent: May 23, 2023

(54) MULTIPLE UPLINK PORT DEVICES

(71) Applicant: Intel Corporation, Santa Clara, CA (US)

(72) Inventors: Debendra Das Sharma, Saratoga, CA (US); Anil Vasudevan, Portland, OR (US); David Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/153,751

(22) Filed: Jan. 20, 2021

(65) Prior Publication Data
US 2021/0165756 A1 Jun. 3, 2021

Related U.S. Application Data

(63) Continuation of application No. 16/706,637, filed on Dec. 6, 2019, now abandoned, which is a continuation of application No. 15/200,260, filed on Jul. 1, 2016, now Pat. No. 10,503,684.

(51) Int. Cl.
G06F 13/16 (2006.01)
G06F 13/42 (2006.01)
G06F 13/40 (2006.01)

(52) U.S. Cl.
CPC ...... *G06F 13/4282* (2013.01); *G06F 13/4072* (2013.01)

(58) Field of Classification Search
CPC .................. G06F 13/4282; G06F 13/4072
See application file for complete search history.

(56) References Cited

U.S. PATENT DOCUMENTS

| 9,137,173 | B2 | 9/2015 | Mayhew et al. |
| 9,176,909 | B2 | 11/2015 | Diard et al. |
| 9,842,075 | B1* | 12/2017 | Davis ................. G06F 13/4295 |
| 10,503,684 | B2 | 12/2019 | Sharma et al. |
| 11,151,065 | B2* | 10/2021 | Lin ..................... G06F 13/1668 |
| 2007/0150762 | A1 | 6/2007 | Sharma et al. |
| 2009/0144476 | A1 | 6/2009 | Cai et al. |
| 2011/0145468 | A1 | 6/2011 | Diard et al. |
| 2013/0108263 | A1 | 5/2013 | Srinivas et al. |

(Continued)

FOREIGN PATENT DOCUMENTS

WO 2010132945 A1 11/2010

OTHER PUBLICATIONS

International Search Report and Written Opinion in PCT Application No. PCT/US2017/034916 dated Aug. 31, 2017; 12 pages.

(Continued)

*Primary Examiner* — Cheng Yuan Tseng
(74) *Attorney, Agent, or Firm* — Alliance IP, LLC

(57) ABSTRACT

A device is provided with two or more uplink ports to connect the device via two or more links to one or more sockets, where each of the sockets includes one or more processing cores, and each of the two or more links is compliant with a particular interconnect protocol. The device further includes I/O logic to identify data to be sent to the one or more processing cores for processing, determine an affinity attribute associated with the data, and determine which of the two or more links to use to send the data to the one or more processing cores based on the affinity attribute.

20 Claims, 10 Drawing Sheets

(56) References Cited

U.S. PATENT DOCUMENTS

| | | |
|---|---|---|
| 2013/0339466 A1 | 12/2013 | Mayhew et al. |
| 2014/0281067 A1 | 9/2014 | Sharma et al. |
| 2015/0067433 A1 | 3/2015 | Wagh et al. |
| 2016/0179427 A1 | 6/2016 | Jen et al. |
| 2017/0068630 A1* | 3/2017 | Iskandar ............. G06F 13/4022 |

OTHER PUBLICATIONS

PCT International Preliminary Report on Patentability in PCT Application Serial No. PCT/US2017/034916 dated Jan. 1, 2019 (8 pages).
SIPO; First Office Action issued in CN Patent Application No. 201780032402.1, dated Nov. 10, 2022; 36 pages including English translation.

* cited by examiner

MULTIPLE UPLINK PORT DEVICES

CROSS-REFERENCE TO RELATED APPLICATIONS

This application is a continuation (and claims the benefit of priority under 35 U.S.C. § 120) of U.S. application Ser. No. 16/706,637 filed on Dec. 6, 2019, entitled MULTIPLE UPLINK PORT DEVICES, which application is a continuation of U.S. patent application Ser. No. 15/200,260, filed on Jul. 1, 2016, now issued as U.S. Pat. No. 10,503,684 on Dec. 10, 2019. The disclosure of the prior application is considered part of and is incorporated by reference in the disclosure of this Application.

FIELD

The present disclosure relates in general to the field of computer development, and more specifically, to configuring a computer interconnect link.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

BRIEF DESCRIPTION OF THE DRAWINGS

Like reference numbers and designations in the various drawings indicate like elements.

DETAILED DESCRIPTION

Figure 1:
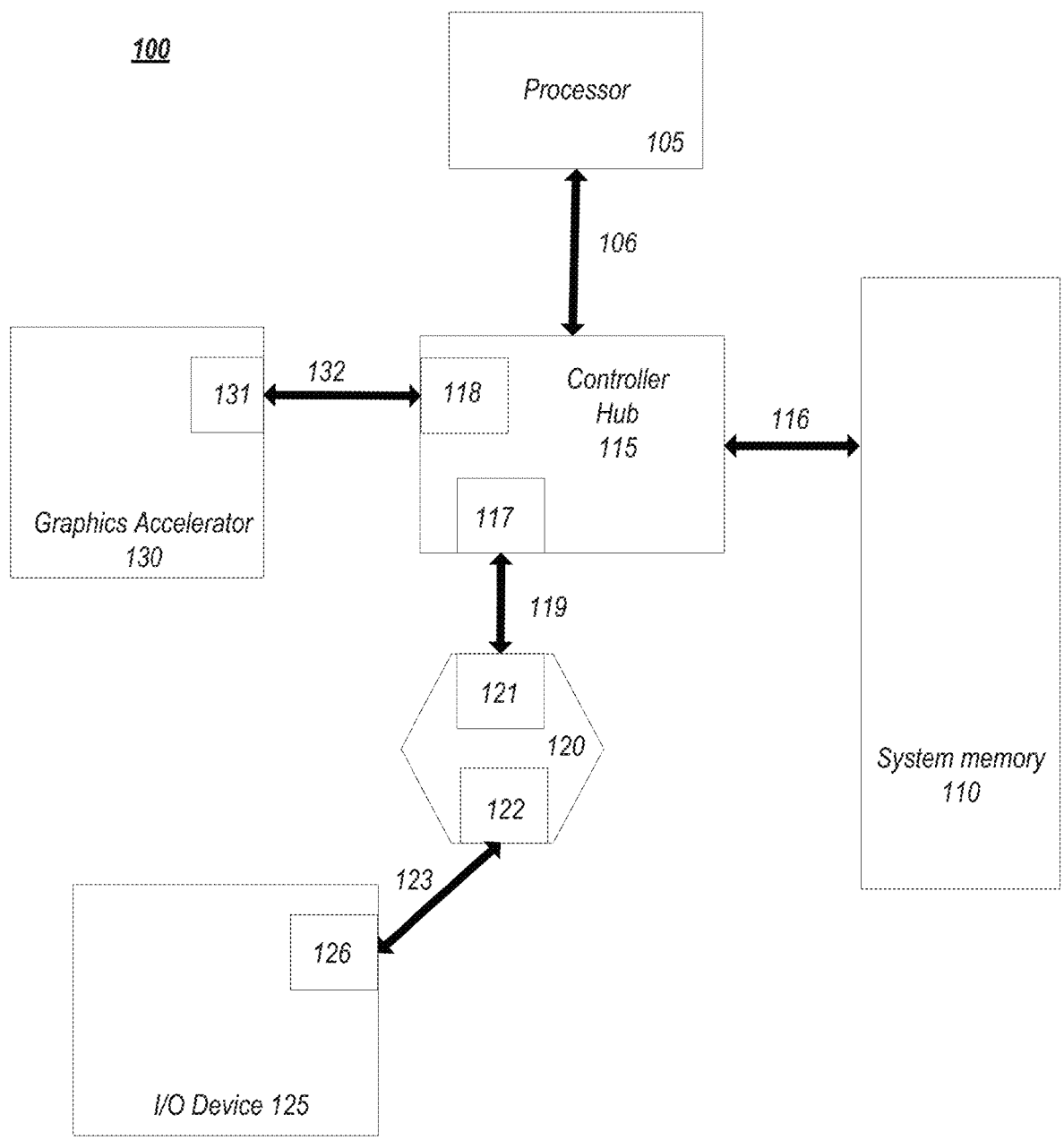
FIG. 1 illustrates a simplified block diagram of a system including a serial point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present disclosure. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective market. For example, servers require higher performance, while the mobile ecosystem is sometimes able to sacrifice overall performance for power savings. Yet, it is a singular purpose of most fabrics to provide highest possible performance with maximum power saving. Further, a variety of different interconnects can potentially benefit from subject matter described herein.

The Peripheral Component Interconnect (PCI) Express (PCIe) interconnect fabric architecture and QuickPath Interconnect (QPI) fabric architecture, among other examples, can potentially be improved according to one or more principles described herein, among other examples. For instance, a primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express. Although the primary discussion herein is in reference to a new high-performance interconnect architecture (such as UltraPath Interconnect (UPI)), aspects of the disclosure described herein may be applied to other interconnect architectures, such as a PCIe-compliant architecture, a QPI-compliant architecture, a MIPI compliant architecture, a high-performance architecture, or other known interconnect architecture.

Referring to FIG. 1, an embodiment of a fabric composed of point-to-point Links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard. One or more components of the system 100 can be provided with logic (in hardware and/or in software) to implement the features described herein.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
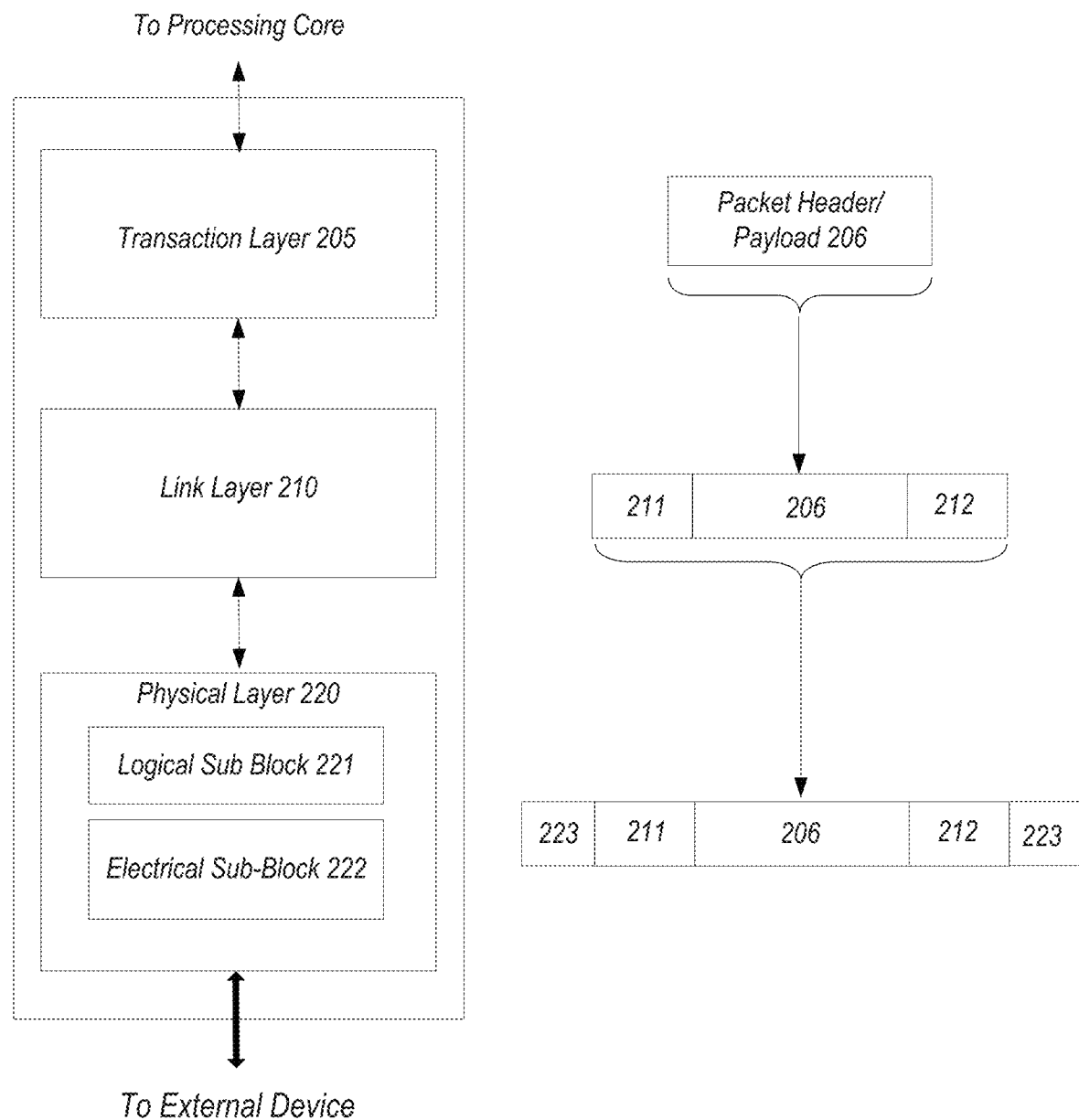
FIG. 2 illustrates a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, a UPI stack, or other layered stack. In one embodiment, protocol stack 200 can include transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

Figure 3:
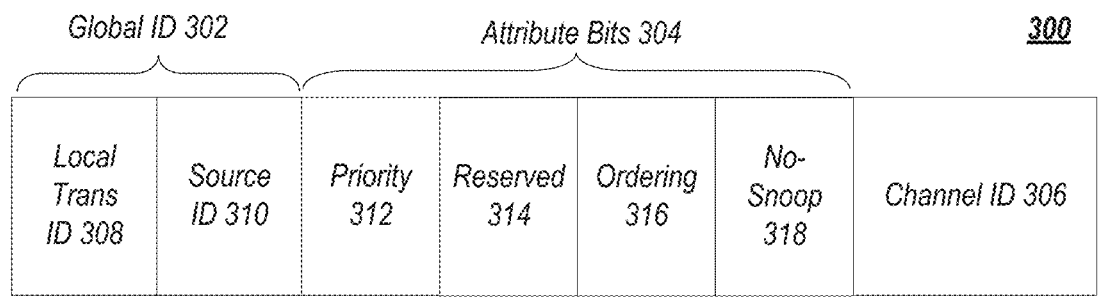
FIG. 3 illustrates an embodiment of a transaction descriptor.

Quickly referring to FIG. 3, an example embodiment of a transaction layer packet descriptor is illustrated. In one embodiment, transaction descriptor 300 can be a mechanism for carrying transaction information. In this regard, transaction descriptor 300 supports identification of transactions in a system. Other potential uses include tracking modifications of default transaction ordering and association of transaction with channels. For instance, transaction descriptor 300 can include global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and can be unique for all outstanding requests that require a completion for that requesting agent. Furthermore, in this example, source identifier 310 uniquely identifies the requestor agent within an interconnect hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Returning to the discussion of FIG. 2, a Link layer 210, also referred to as data link layer 210, can act as an intermediate stage between transaction layer 205 and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 221. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is deserialized and supplied to logical sub-block 221. In one example embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Figure 4:
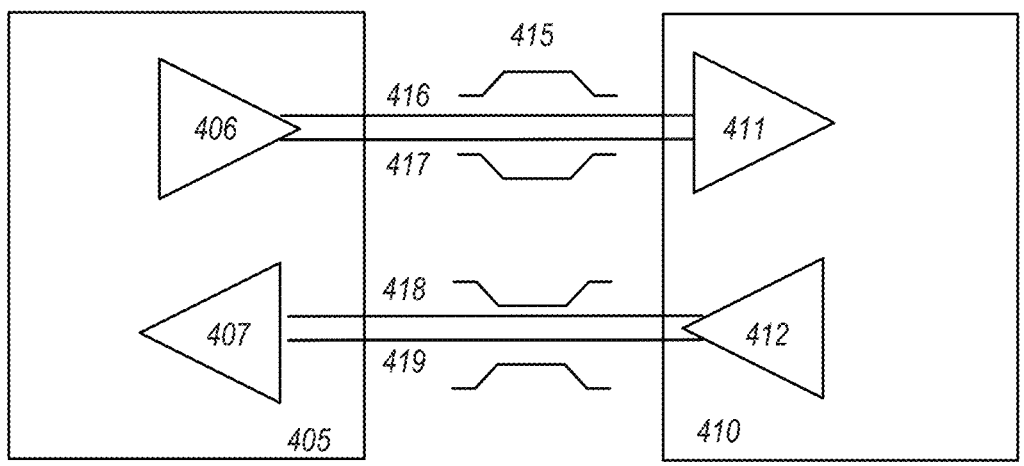
FIG. 4 illustrates an embodiment of a serial point-to-point link.

Referring next to FIG. 4, an example embodiment of a serial point to point fabric is illustrated. A serial point-to-point link can include any transmission path for transmitting serial data. In the embodiment shown, a link can include two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in some implementations of a link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. crosscoupling, voltage overshoot/undershoot, ringing, among other example advantages. This allows for a better timing window, which enables faster transmission frequencies.

In one embodiment, a high performance interconnect such as UPI can be provided. UPI can include a next-generation cache-coherent, link-based interconnect. As one example, UPI may be utilized in high performance computing platforms, such as workstations or servers, including in systems where PCIe or another interconnect protocol is typically used to connect processors, accelerators, I/O devices, and the like. However, UPI is not so limited. Instead, UPI may be utilized in any of the systems or platforms described herein. Furthermore, the individual ideas developed may be applied to other interconnects and platforms, such as PCIe, MIPI, QPI, etc.

Figure 5:
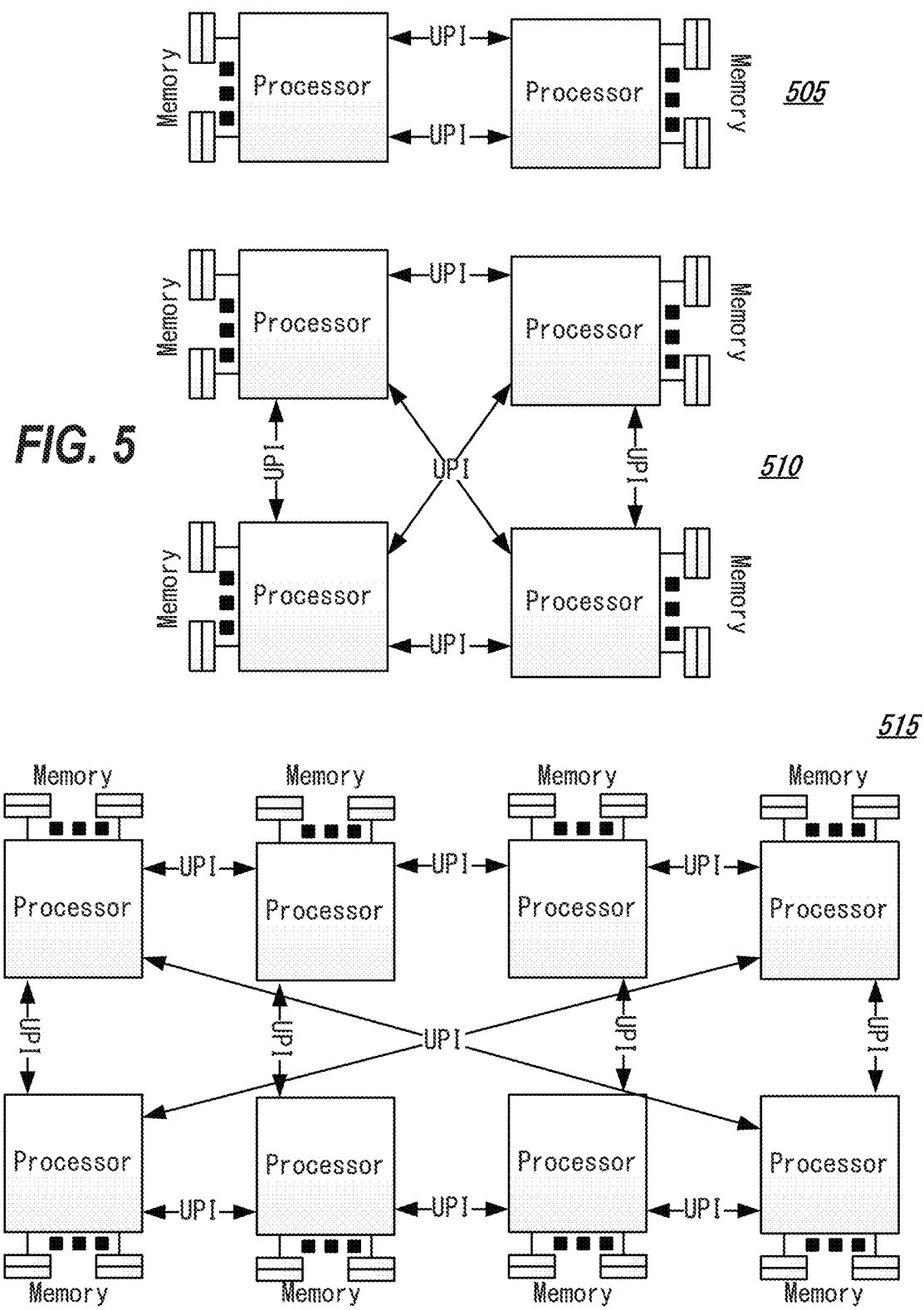
FIG. 5 illustrates embodiments of potential multi-processor system configurations.

To support multiple devices, in one example implementation, UPI can include an Instruction Set Architecture (ISA) agnostic (i.e. UPI is able to be implemented in multiple different devices). In another scenario, UPI may also be utilized to connect high performance I/O devices, not just processors or accelerators. For example, a high performance PCIe device may be coupled to UPI through an appropriate translation bridge (i.e. UPI to PCIe). Moreover, the UPI links may be utilized by many UPI based devices, such as processors, in various ways (e.g. stars, rings, meshes, etc.). FIG. 5 illustrates example implementations of multiple potential multi-socket configurations. A two-socket configuration 505, as depicted, can include two UPI links; however, in other implementations, one UPI link may be utilized. For larger topologies, any configuration may be utilized as long as an identifier (ID) is assignable and there is some form of virtual path, among other additional or substitute features. As shown, in one example, a four socket configuration 510 has an UPI link from each processor to another. But in the eight socket implementation shown in configuration 515, not every socket is directly connected to each other through an UPI link. However, if a virtual path or channel exists between the processors, the configuration is supported. A range of supported processors includes 2-32 in a native domain. Higher numbers of processors may be reached through use of multiple domains or other interconnects between node controllers, among other examples.

The UPI architecture includes a definition of a layered protocol architecture, including in some examples, protocol layers (coherent, non-coherent, and, optionally, other memory based protocols), a routing layer, a link layer, and a physical layer. Furthermore, UPI can further include enhancements related to power managers (such as power control units (PCUs)), design for test and debug (DFT), fault handling, registers, security, among other examples.

PCIe has become a popular solution for facilitating local I/O connections in modern computing system. In particular, PCIe may be used to provide an I/O link between a system CPU and chipset components, such as various devices coupled to the CPU through a platform controller hub, such as network interface controllers (NIC), storage controllers, graphics processing unit (GPU), and other such devices. PCIe may be further used to implement on-die and in-package links and other local I/O solutions.

PCIe and other point-to-point interconnects may be designed to principally support tree topologies, and may not support "redundant" links between a single device and root hub, CPU, PCH, etc. to provide enhanced reliability, availability and serviceability (RAS), performance, or other features. PCIe performance is already on the same order of magnitude as memory system performance and coherency fabric performance, so the bandwidth demands of high performance devices can be very taxing even for highly capable platforms. For example, an x6 Gen 4 PCIe device can sustain close to 30 GB/s in each direction, which can readily saturate two DDR channels in some implementation. Indeed, the aggregate sustainable PCIe Gen3 bandwidth in some systems has increased dramatically while PCIe Lane count has increased only modestly (e.g., 40 to 48 Lanes), for instance, due to increase in memory bandwidth per socket. PCIe bandwidth is also pushing us to have three coherent Links instead of two in our two-socket coherent platforms.

In one implementation, a single device (e.g., an individual NIC, solid state drive (SSD), GPU, etc.) may be provided with multiple ports to enable multiple links (e.g., PCIe links) between the device and a socket hosting one or more CPU cores. Multiple upstream links from a single device may be utilized to provide certain system enhances and support new use cases. For instance, multiple upstream links may be utilized to increase the bandwidth available to the device. For instance, a device may be provided with bandwidth requirements exceeding that which is practicable from a single x16 at the maximum available data rate (e.g., 8 GT/s x16 in PCIe Gen3 and 16 GT/s x16 in PCIe Gen 4). In some instances, multiple device uplinks may also enable better cache (e.g., last level cache (LLC)) utilization in a system and assist in managing sensitive bandwidth demands of interprocessor links (e.g., in a multi-socket system). Multiple device upstream links may also be used to optimize I/O and core affinity (e.g., in multi-socket systems) and enable flexible system configurations for workload optimization, failover and increased fault tolerance, and other purposes and examples.

Figure 6:
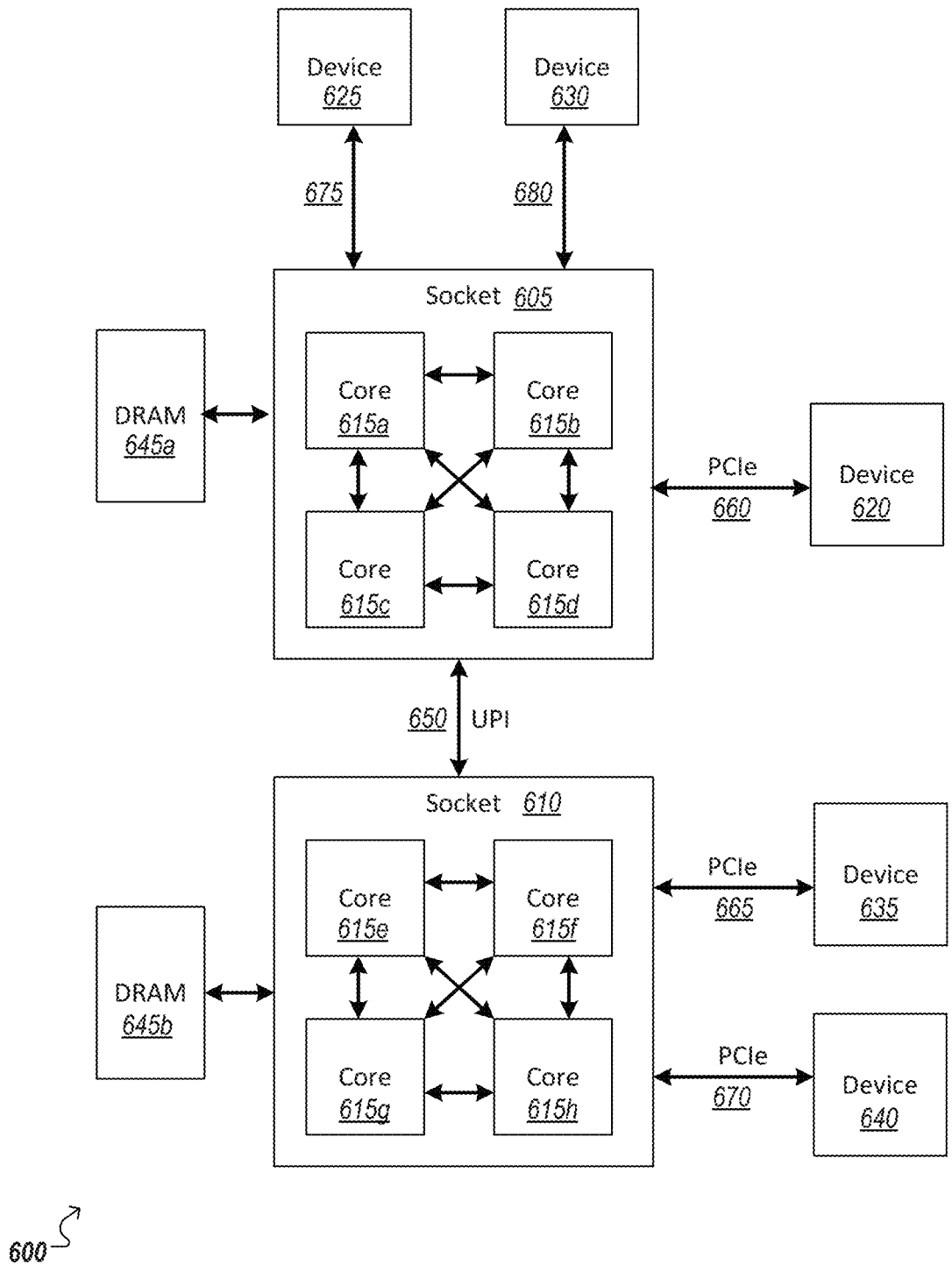
FIG. 6 illustrates an embodiment of a multi-socket system.

Turning to FIG. 6, a simplified block diagram 600 is shown illustrating an example system and local I/O connections to interconnect multiple processor sockets and devices in a multi-socket system. For instance, multiple processor sockets 605, 610 may be provided, each with multiple processor cores (e.g., 615a-h). A socket may be embodied as a physical connector on a computer board that accepts a single physical chip. A socket, within this disclosure, may also refer to a single physical chip that has been soldered or otherwise connected to a board or platform and locally interconnected with one or more other devices on the platform. Many motherboards can have multiple sockets that can in turn accept chips that include one or more processors, or cores. Indeed, in this disclosure, a core may be a logical execution unit (e.g., a CPU or other processor) and may additionally include a local cache among other functional units. A core (e.g., 615a-h) may be able to independently execute programs or threads, and a socket (e.g., 605, 610) or platform (with multiple multi-core sockets) may allow concurrent execution of multiple treads and programs using the multiple cores (e.g., 615a-h).

Downstream ports may be provided on the sockets 605, 610 to locally connect the sockets to various other devices (e.g., 620, 625, 630, 635, 640) such as memory controllers, GPUs, NICs, peripherals, and other devices. Further, each socket 605, 610 may be allocated a portion of system memory in the form of dynamic random access memory (DRAM) or other local memory elements (e.g., 645a-b). Workloads and data may be shared within the platform via a fabric of links implemented on the platform. For instance, cores (e.g., 615a-d and 615e-h) may be interconnected by a fabric utilizing a defined interconnect protocol. Inter-socket messaging and transactions may be facilitating using an interprocessor link 650 utilizing a high performance interconnect protocol such as UPI, QPI, etc. Ports supporting connections to DRAM 645a-b and external devices (e.g., 620, 625, 630, 635, 640) may support and utilize various interconnect technologies to enable connections to devices using such varying technologies. For instance, one or more PCIe ports (and PCIe controllers) may be provided on each socket 605, 610 to facilitate the possible connection of various PCIe-compliant devices (e.g., devices supporting PCIe-compliant links). For instance, device 620 may interconnect directly with socket 605 in this example through a PCIe link 660 (and the PCIe port of socket 605) and devices 635 and 640 may likewise connect directly to socket 610 via respective PCIe links 665, 670 respectively. Additional ports may be provided to support links using other interconnect technologies such as QPI, DDR4, MIPI, AMBA, PCI, UPI, TSMI, among other examples. For instance, devices 624, 630 may be connected to socket 605 using non-PCIe links 675, 680.

Links (e.g., 660, 665, 670, 675, 680) may provide interfaces between devices (e.g., 620, 625, 630, 635, 640) and sockets 605, 610 and their cores (e.g., 615a-h) and memory (e.g., 645a-b). Further, interprocessor links (e.g., 650) may effectively interconnect all the elements of a platform and permit processing and memory resources associated with one socket (e.g., 610) to be made available to devices (e.g., 620) not directly connected to the socket (e.g., 610), but which are connected to another socket (e.g., 605) connected via an interprocessor link 650. Such transactions, however, may be costly, as the transaction is to not only traverse the link (e.g., 660) connecting the device (e.g., 620) to a first processor or socket (e.g., 605), but is to then also be routed over one or more interprocessor links (e.g., 650) to reach a destination core (e.g., 615g) and/or associated memory (e.g., 645b), which may additionally involve cache coherency management (and additional interprocessor traffic to achieve the same). Such traffic absorbs bandwidth of the interprocessor link 650, which may instead be designed to support primarily processor-to-processor messaging and transactions (and not device-initiated traffic). Accordingly, some systems may be designed based on an assumption, prediction, or policy that transactions involving a particular external device (e.g., 620) may primarily use only the processing and memory resources associated with the socket (e.g., 605) to which it is directly connected, although such strict transaction boundaries may be difficult to realize in practice.

A transaction involving an external device can include requests (e.g., reads, writes, interrupts, link state messaging, etc.) and responses (e.g., completions, data, acknowledgments, etc.) exchanged between the device (e.g., 620) and one or more cores (e.g., 615a-h). Packets, messages, and other data, which are sent from a core to a device (e.g., 620, 625, 630, 635, 640) travel in a "downstream" direction away from the core (and over a downstream link, or downlink, port of the processor (or its corresponding socket 605)). Data originating at the device and sent from the device to a core travels in an "upstream" direction back up to the core, and therefore is said to travel over an upstream link, or uplink, port of the device (e.g., 620, 625, 630, 635, 640). Indeed, in one convention, any port of a device which is to enable a connection with a processor, core, or processor socket may be considered an upstream, or uplink port.

Figure 7A:
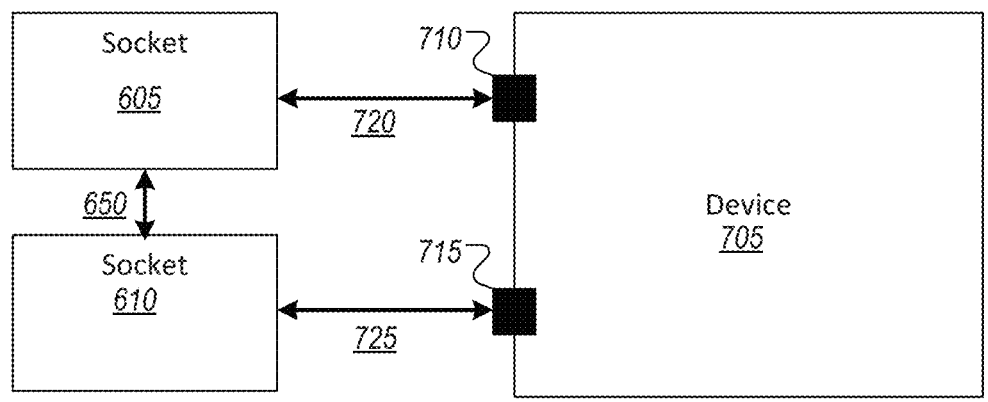
FIGS. 7A-7C illustrate embodiments including a multi-uplink port device.
Figure 7B:
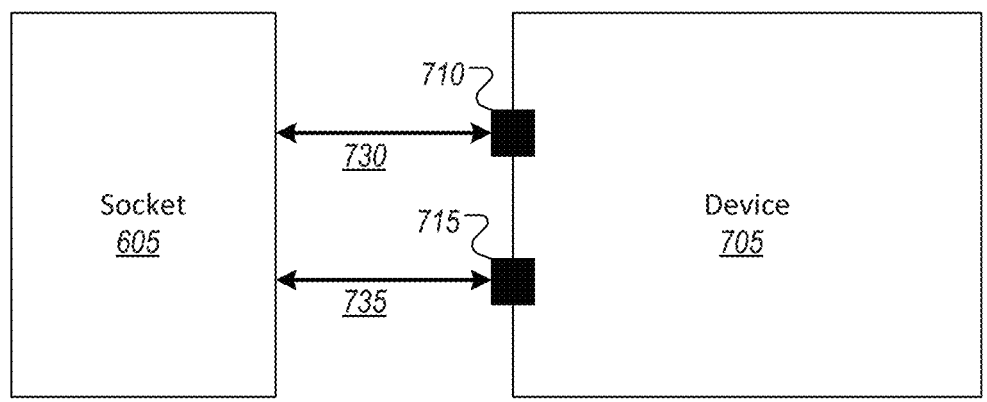
Figure 7C:
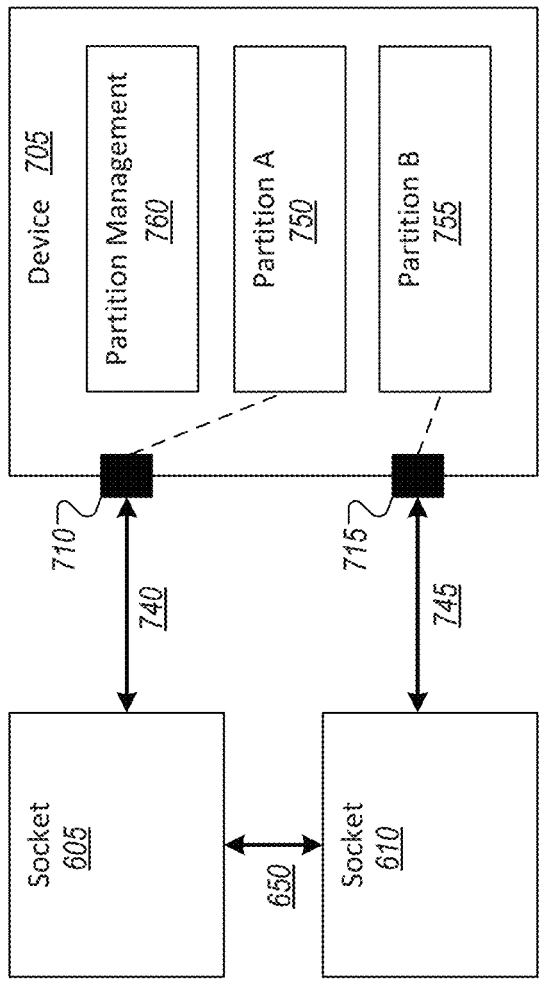

Turning to FIGS. 7A-7C, while devices traditionally are provided with a single uplink port, devices may be enhanced to be provided with multiple uplink ports to directly connect the single device through multiple links to a single processor or socket or even multiple sockets. For instance, in FIG. 7A, in implementation of a two uplink port device 705 is shown. The multiple uplink ports 710, 715 provided on the device 705 may be utilized to connect the device 705 to multiple different (interconnected) sockets (e.g., 605, 610) in a multi-socket system through links 720, 725. This can be used to assist in mitigating device-initiated traffic being routed over an interprocessor link 650. For instance, it may be the case that even a single link may provide sufficient bandwidth for all transaction between a given device (e.g., 705) and a socket (e.g., 605, 610), however, a more pressing constraint for the system may be to reduce interprocessor traffic (e.g., UPI traffic) over interprocessor links (e.g., 605) by utilizing the multiple ports 710, 715 of the device 705 to direct PCIe traffic to that link which most directly connects the device 705 to the destination of that traffic. In some local interconnect technologies, the interconnect specification may be designed upon the assumption that a single device will always have a single uplink port, and additional logic may be maintained and utilized at the multi-port device 705 to determine which of its links to use for the sending of a particular data. For instance, in the case of determining which link to use (and which socket (e.g., 605 or 610) in a multi-socket system, the device 705 may consider or predict which of the links (e.g., 720 or 725) has an affinity with a specific transaction attribute, such as the type of I/O activity, relationship between a link and a defined device pairing or identification (e.g., a NIC or storage queue pair, or a virtualized I/O device instance), such that the appropriate link (e.g., 720 or 725) is used to most directly route the traffic to the appropriate CPU socket, the socket's associated system memory (DRAM, 3DX-Point, etc.), and/or a particular core within the socket. Indeed, in many cases the coherency traffic between two sockets (e.g., 605, 610) has a direct performance when I/O-related traffic is conveyed from one socket to another. Accordingly, in some cases, properly directing device-initiated traffic to an appropriate one of two or more uplinks may be to not only simplify I/O intensive workloads by removing the dependency on available UPI (or other interprocessor) bandwidth, but also to allow non-I/O workloads to have more UPI bandwidth available. Interprocessor link bandwidth reduction by directing the I/O to go to the appropriate socket (on a multi-uplink port device (e.g., 705)) has the benefit of lower power and cost by allowing smaller (i.e., lower lane count) interprocessor links, among other example advantages.

Turning to FIG. 7B, a device 705 may also be provided with two or more uplink ports (e.g., 710, 715) to connect to a single socket (e.g., in a multi-socket or single socket system). Indeed, in still other implementations, three or more uplink ports may be provided on the device 705 to allow the device to connect to a first socket using two or more multiple uplinks and another socket using another one of the uplinks, among other implementations. In the example of FIG. 7B, the multiple uplink ports 710, 715 of the device 705 may enable multiple links 730, 735 (e.g., PCIe links) between the device 705 and socket 605. Such an implementation may be utilized to establish more bandwidth between the device 705 and socket 605 than would be permitted by a single link. For instance, some activities of a particular device (e.g., 705) may require more bandwidth than is available from a single PCIe link. For instance, device 705 may be a GP-GPU/Accelerators or may be a device that is to connect (via the links 730, 735) to a platform utilizing a very high performance Ethernet, InfiniBand, and other High-Performance Computing (HPC) fabrics or high performance storage, among other examples.

In still another example, shown in FIG. 7C, a device 705 may be provided with functionality to implement one or more logical partitions to allow a single device to appear and logically function as two distinct devices. Such a feature may be utilized within a multi-socket system (similar to the example of FIG. 7C), with each device partition 750, 755 assigned to a respective one of the multiple uplink ports 710, 715 provided on the device 705 and connected, through the corresponding port (e.g., 710 or 715) to one of the sockets (e.g., 605 or 610) in the multi-socket system. Data to be exchanged between a first one of the partitions (Partition A 750) and a first socket 605 may be sent over link 740 and data to be exchanged between a second one of the partitions (Partition B 755) and a second socket 610 may be sent over link 745. In some examples, it may be expected that no traffic initiated by either one of the partitions 750, 755 will traverse the interprocessor link 650, as each socket 605, 610 perceives its assigned partition as its "own."

In some implementations, a device 705 may be further provided with partition management logic 760 to allow partitioning of the device to be selectively enabled (and disabled). For instance, a device 705 may operate in either a partitioned or unpartitioned mode, controlled by the partition management logic 760. In an unpartitioned mode, the device 705 may operate and present itself to the system as a single, unitary device (similar to the example of FIG. 7A). With partitioning enabled, the device 705 may define a number of partitions up to the number of uplink ports provided on the device (e.g., in the case of FIG. 7C, the partition management logic 760 may enable two partitions corresponding to the uplink ports 710 and 715). In such examples, the system can either operate as a coherent two socket system (e.g., as shown in FIG. 7A) or two independent one socket system (e.g., as shown in FIG. 7C). Selective partitioning may provide flexibility to an end-user to configure the system based on the workload they intend to run. In instances where a platform needs to have two redundant devices, one connected to each of multiple sockets, partitioning can be utilized to reduce cost, improve performance, and lower power consumption by providing a single partitionable device (as in the example of FIG. 7C) as opposed to two separate, redundant devices, among other examples.

Figure 8:
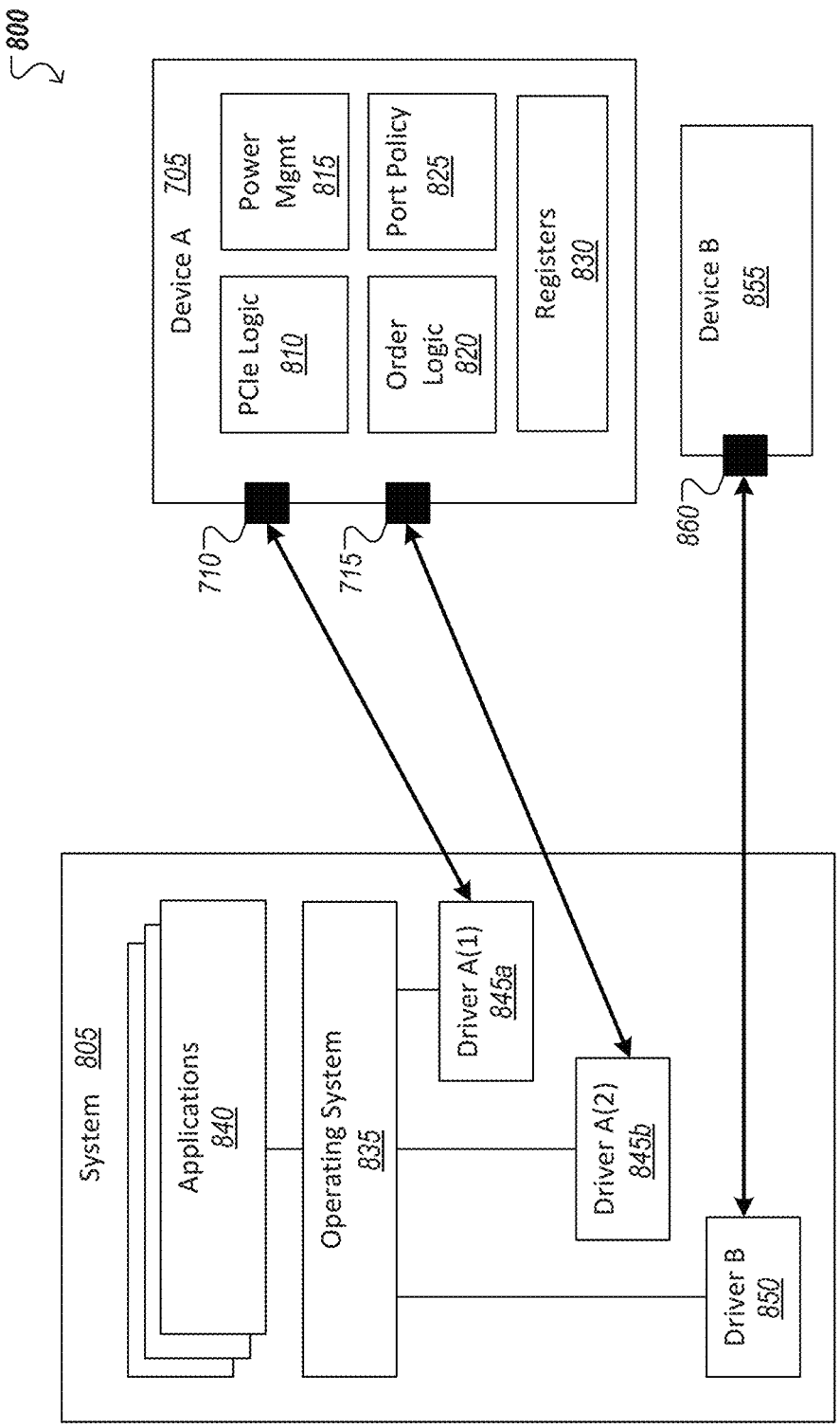
FIG. 8 illustrates a representation of an example system including a multi-uplink port device.

Turning to FIG. 8, a simplified block diagram 800 is shown illustrating additional details, which may be incorporated in an example device (e.g., 705) implementing two or more uplink ports (e.g., 710, 715), as well as platforms utilizing such devices. In one example, a device 705 may include its own processor and memory with code stored thereon for execution by the processor to implement components such as PCIe logic 810, power management logic 815, ordering logic 820, port policy logic 825, and registers 830. One or more of these components may be alternatively implemented, at least in part, through hardware and electronic logic circuitry. As noted in previous examples, uplink ports 710, 715 may permit a device to interface with one or more sockets or processors (not shown in FIG. 8) of a system 805. The system 805 may include software including an operating system 835, one or more applications 840, and drivers (e.g., 845a-b, 850, etc.) to support devices connected to the system 805. The devices and sockets (and composite cores of the sockets) of a local system may each share a common system image with the operating system 835. Applications 840 running on the operating system 835 may include functionality for using one or more of various devices (e.g., 705, 855) connected to the system, and interact (through the operating system 835) with the devices by sending and receiving data through corresponding device drivers (e.g., 845a-b, 850).

In one example, device 705 may be a PCIe-compliant device and may possess PCIe logic 810 to implement links, registers, capabilities, data structures, and functionality consistent with requirements of a PCIe specification (e.g., PCIe Base Specification Revision 3.0) Accordingly, PCIe logic 810 may include a layered protocol stack to implement link training, messaging, and state transitions of PCIe, as well as logic to implement PCIe state machines and other features. From the perspective of the system, data sent to or received from a multi-port device 705 may appear no different than data sent from a single port PCIe device. However, as PCIe (and other point-to-point interconnect technologies) may be based on an assumption of a single port paradigm, additional I/O functionality (e.g., 815, 820, 825, etc.) may be provided on the device 705 to supplement and enable PCIe-compliant communications using multiple links.

As an example, an interconnect protocol may specify certain rules or policies which are expected for transactions over a protocol-compliant link. For instance, PCIe defines a transaction ordering paradigm, which assumes a tree topology with only one possible path between any pair of a requester and completer. While some of the examples herein focus on the case where two (or more) links are provided between a device and a host, it should be understood that this can be generalized to other topologies. For a multi-port device, managing the ordering of multiple transactions for the device, when these transactions may involve data sent and received on distinct links (and even between distinct sockets), complicates and may jeopardize compliance with transaction ordering rules, policies, or definitions of an interconnect protocol. For instance, PCIe ordering rules assume that there are never redundant paths and, as a result, does not natively ensure that the PCIe Producer/Consumer ordering model requirements are followed for configurations utilizing one or more multi-uplink port devices.

In some implementations, to assist in addressing the complexity of negotiating protocol ordering rules on a device utilizing multiple uplink ports, ordering logic 820 may additionally include functionality to identify any opportunities (e.g., specific transactions) where ordering is not required and supplemental ordering functionality of the ordering logic 820 (and its associated overhead) may be set aside. Indeed, ordering logic 820 may identify only those transactions where ordering is required and forego ordering tasks for all other transactions. For instance, at the same time, it is highly desirable to recognize where ordering is not required as there can be a significant overhead when ordering must be enforced between multiple Links, and so this should be done only when specifically required. Fortunately, PCIe already provides a framework for ordering relaxation, e.g. through Relaxed Ordering (RO) and ID-Based Ordering (IDO) of PCIe may be utilized to identify ordering requirements of a transaction or data flow, and these as well as device or protocol-specific techniques may be used to determine when default ordering requirements may be relaxed. For example, in a conservative approach, ordering logic 820 may enforce ordering for all transactions except those explicitly indicated as being suitable for PCIe Relaxed Ordering.

If ordering is determined to apply, ordering logic 820 can possess functionality to supplement standard ordering functionality for a corresponding protocol (e.g., in PCIe logic) and manage ordering for the device 705 over multiple links (e.g., either between the device and a single socket or multiple sockets). As an example, in an implementation providing multiple PCIe-compliant uplinks, baseline PCI/PCIe ordering enforcement semantics using ordered Read Completions and/or ordered Writes may be insufficient to realize ordering rules due to the independent data paths provided by the multiple device uplinks. In one example, supplemental ordering logic (e.g., 820) may realize ordering enforcement on multiple uplinks through flushing and/or an enhanced multiple flag-based approach.

In the case of a flushing-based approach to facilitating PCIe ordering on a multi-uplink device, ordering logic 820 may leverage existing flushing techniques defined in PCIe, such as Zero Length Reads, to allow a flush to be performed by the device 805 (e.g., without utilizing software-based interventions or modifications). Zero Length Reads may be implemented as a memory read request of a single data word (DW) with no bytes enabled. Such a read request may be issued by the device 705 (in accordance with ordering by ordering logic 820) to request a flush. In some cases, where Zero Length Reads (or another transaction) is utilized to achieve a flush, it may be first determined whether a flush is needed or not before the flush transaction is triggered. For instance, a Zero Length Read may be skipped, for example, if the device is already reading data from the Completer, in which case the return of the data being read also implies the completion of a flush. The flush semantic allows a device to ensure that previously issued Posted Writes have been completed at their PCI Express destination. The request may include an address that targets the same device as the Posted Writes that are to be flushed (e.g., by identifying and using the same address as one of the Posted Writes to be flushed).

In some cases, if multiple write operations target different destinations, it may be necessary to perform multiple flush operations, for example, so that a flush is performed to each distinct memory region written to. For example, a conservative approach may implement a distinct flush operation to each aligned 4 KB region of memory where any write operations have been performed since the preceding flush operation, among other example implementations.

Ordering logic 820 of a multi-port device 705 may recognize a scenario where synchronization is to ensure correct ordering, for instance, by detecting when the action of a single device "thread" (e.g. the servicing of a single DMA operation) has caused writes to be issued on more than one of the device's links. Ordering logic 820 may then determine which of the device's links is to be synchronized, for example, in a case where the device has written data over two links, by means of a flushing operation on one link which, when completed, allows a write to set a flag or trigger an MSI to be issued on the other link. In some cases, flush requests may be issued and flushing read completions received for the device's other link(s) before initiating the synchronization action. For example, in a case where the device has written data over two links, by means of a flushing operation on one link which, when completed, allows a write to set a flag or trigger an MSI to be issued on the other link.

In the case of an enhanced flag-based approach to facilitating PCIe ordering on a multi-uplink device, ordering logic 820 may send separate flag writes on all links of a multi-port device (e.g., 705) on which transactions are to be added. A flag may be an indicator that a write has been performed. In some cases, the flag may be set in a register corresponding to a device or a particular port of the device. In some cases, a pointer (e.g., used in connection with a buffer structure) may be utilized as the flag, indicating that data has been written to a particular portion of the buffer, among other examples. Regardless of the implementation, a driver, memory management system, operating system, or other software may utilize the flags to identify when writes have been performed (e.g., in connection with write requests on potentially two or more of the ports of the multi-link device) to determine how to order reads, completions, or other transactions involving requests received on the multiple uplink ports of the device (e.g., 705). In some examples, data structure(s) used for hardware/software communication of such may be modified to enable the sending of such multiple flag writes. If this is done, the location of these flags will impact the performance, and it would be beneficial to provide flexibility to coordinate, based on what is optimal for a specific platform, if the multiple flags are in the same cacheline or in different cachelines.

PCIe logic 810 (or other protocol logic) may allow the device 705 and its links to individually support various link power (e.g., L0, L1, L2, etc.) and device states (e.g., D0, D1, D2, D3, etc.) defined for a particular interconnect protocol. In some cases, however, a state transition at one of the multiple links of a multi-uplink device's ports 710, 715 may be impacted or driven by a state transition on another one of the links. Device power state may be uniquely impacted on a multi-port device in light of the possibility that downstream, host-initiated traffic (being received by the device) can appear on more than one link, and therefore more than one port of the device. In such cases, the device may be kept in a relatively higher power state to be ready to process host requests. In some implementations, power management logic may consider the state of links of each of its multiple ports in determining which device power state to transition to and remain. Device state may impact all of the multiple links and result in transitioning all links in and out of the appropriate link power states together. For instance, in PCIe, for architectural power states like D1, D2, D3, and non-architectural cases like D0ix, the device may transition all links in and out of the appropriate same link power states together (e.g., in transitions into and out of a D3 state). In other cases, the power management logic may identify opportunities to keep one of its links in one power state, and another of its links in a different power state, among other examples.

As noted in other examples described above, a multi-port device may be utilized to connect the same device to multiple distinct sockets using dedicated links (such as shown in FIG. 7A). Additional logic (e.g., 825) may be provided on such devices (e.g., 705) to direct the device to select, which of the ports (and links) to use for the sending of various device-initiated traffic. In some instances, policies may be defined (and stored in memory of the device) to provide guidance to policy logic 825 in determining an appropriate port (e.g., 710 or 715) for the traffic. In some implementations, policy may pertain to defining affinities of certain types of traffic or traffic possessing certain attributes for particular ports. Indeed, a policy or guideline may map certain traffic to a specific one of the device's ports. Accordingly, policy logic 825 can determine whether particular data has an attribute corresponding to one of the device's policies and determine whether the particular data has an affinity for a particular one of the device's ports. If such a determination is able to be made, the device 705 may cause the data to be sent on the corresponding port (e.g., 710 or 715). Making imperfect traffic distribution determinations for its multiple links may be acceptable, for instance, in multi-socket systems, as interprocessor links may ensure that traffic is ultimately routed to its destination, even if the port selected by the device 705 was the suboptimal link for delivering the traffic to the destination.

Policies can be defined to guide policy logic 825 in determining the appropriate port for sending upstream traffic. As an example, policies can be defined for thread-specific affinities, such that traffic corresponding to certain threads (e.g., control traffic, MSI, core-processing) is directed to certain ports (e.g., based on a process ID corresponding to a thread as generated by the operating system). In another example, policies can be defined for memory-block specific affinities, such that data destined for a particular block of memory that is more efficiently reached using a particular one of the upstream ports is directed to the destination using the particular port. Further, where traffic is in response to a CPU-initiated request (e.g., a doorbell write), policies may call for the policy logic 825 to identify the specific core or socket (e.g., from the request's Requester ID) and map the identified requester to a particular one of the device ports (e.g., 710 or 715) such that data sent in response to the request is sent on a port directly (or most directly) connecting the device 705 to the requester resource. Such a mapping of requesters to ports may be obtained, for instance, through driver- or platform-specific knowledge to associate sets of Requester IDs with the correct socket (and thereby port). In another example, the driver (e.g., 845*a-b*) of the device 705 may explicitly direct affinity policy by tagging work descriptor data sent to the device (e.g., with a port or socket identifier). Policy logic 825 can identify a tag included in the work descriptor, determine the port (e.g., 710 or 715) that corresponds to the tag, and cause traffic generated by the device 705 in response to the work descriptor to be sent over the corresponding port.

In some implementations, the operating system 835 of the system may assist in defining memory-based affinities, for instance, by communicating a mapping to the device driver (e.g., 845*a-b*) identifying which memory (e.g., by address) is directly accessible through which socket (and thereby the port connected to that socket). In still another example, sockets may send hint data to the device 705, which the policy logic 825 may cause to be cached at the device 705 and later accessed to adapt dynamically to the configuration of the CPUs and implement new memory mapping mechanisms in a backwards compatible way. For instance, in some cases, a driver 845*a-b*, the operating system 835, an application 840, or other logic executed on a system 805 may determine (e.g., from a mapping) an affinity between particular types of traffic (e.g., types of traffic initiated by a multi-port device (e.g., 705) or types of traffic sent by the multi-port device in response to downstream traffic) and may cause the affinity to be indicated to the device (and its policy logic 825) through a hint that is appended to data sent to the device. In some cases, the hint may be appended to downstream traffic that is not related to the traffic to which the affinity indicated in the hint applies. In other cases, the hint may be included in traffic of a type to which the hint applies. In response to a hint, the policy logic 825 may determine a port to use for the sending of subsequent traffic (of a corresponding type). In some cases, the policy logic 825 may determine a policy from the hint (e.g., determine that traffic addressed to a particular destination that falls within a given address range is to always be sent on a particular one of the multiple uplink ports), among other examples.

In another example, policies may be defined that cause port policy logic 825 to map certain functions or activities of the device 705 to a particular core or socket. For instance, each feature, function, or activity capable of being implemented using the device 705 may first need to be enabled through an instruction from the system CPU. In one example, when an instruction is received to enable a particular device activity, port policy logic 825 may identify the source of the instruction (e.g., that the instruction arrived on a particular one of the device ports 710, 715, from a particular core or socket, etc.) and then define a policy that causes all traffic generated by the device 705 in connection with that activity to be sent on the same link (on which the initial instruction arrived), among other examples. Indeed, policies may be tailored specifically to the operating system 835, platform, and device 705. Accordingly, a user (or even the operating system) may define policies to be applied in connection with a particular multi-port device.

Management and interaction with registers and configuration space (e.g., 830) of a multi-port device 705 may also be complicated, such as in systems that specify a strict link-to-device paradigm. A host system (e.g., 805) may be a physical computing system that hosts the sockets to which a device locally connects, and all socket cores, devices, and operating system may share a common system image. Host system software may include the operating system 835 and one or more applications 840. In some implementations, host system software may expect a distinct device to be found below all active links. For instance, an operating system 835 may presume that each link to a device (e.g., 705, 855) is to a distinct device, and thereby fail to natively recognize that two or more of these links actually connect to the same device (e.g., 705). Further, as shown in the example of FIG. 8, distinct drivers 845*a*, 845*b*, 850 may be required for each link on some platforms, resulting in multiple instances of potentially the same driver (e.g., 845*a*, 845*b*)

being bound to the same device (e.g., 705). In one implementation, the device 705 may present a PCIe configuration space to each uplink, where the Vendor ID, Device ID, Class/Sub-Class/Programming Interface (PI) are the same for each, and each binds to a distinct instance (e.g., 845a and 845b) of the same driver. In some instances, one of the multiple driver instances 845a, 845b may be designated as a principal driver and the remaining instances as second drivers. The designation of a redundant driver instance as principal or subordinate may be made in associated device-specific configuration space (e.g., through a specific bit value), a device-specific register, descriptor, or other mechanism. A device driver (e.g., either a principal or subordinate driver) can query the device and the device can indicate that a specific one of its links is to be designated as the principal interface. A driver (e.g., 845b) designated as subordinate, in some implementations, may not initiate device 705 action, but may only be permitted to respond to required signals and messaging from the operating system 835. For the principal driver (e.g., 845a), the driver is to configure and operate the device 705 as usual. In some cases, subordinate drivers may utilize corresponding configuration and memory mapped I/O (MMIO) resources to assist the host operating system 835 in distinguishing between the multiple links of the device 705. The operating system 835 may then use this information to assist in establishing port and/or socket affinities. For architected drivers, such as Non-Volatile Memory Express (NVMe) drivers, where the principal/subordinate concept is to be comprehended by the "in box" device drivers, consistent PCIe Configuration bit/fields may be used to distinguish between principal/subordinate links (e.g. through a bit located in the PCIe Link Capabilities 3 register) and at the same time indicate the relationship between the drivers or assigned address space (e.g., that they each "belong" to the same device). In some implementations, software and/or hardware mechanisms (e.g. scratchpad space) may additional provided for implementations where multiple driver instances have been bound to a multi-port device to facilitate communication between the driver instances.

Although the foregoing disclosure focused its discussion and examples on multi-port PCIe devices, it should be appreciated that the above principles and features may be implemented in connection with other multi-port devices compliant with alternate interconnect protocols other than PCIe (e.g., which are also similarly tuned to single device uplinks). Likewise, while UPI is mentioned as a potential interprocessor (e.g., socket-to-socket) link protocol) other link technologies may be alternatively used. Further, while some of the examples have discussed the use of multi-port devices in connection with two socket systems, it should also be recognized that the principles above may be equally applicable to systems using three, four, or more sockets. Further, host systems utilizing these features, sockets, and devices may include or embody any one of a variety of computing devices and systems, including mainframes, server systems, personal computers, mobile computers (such as tablets, smartphones, personal digital systems, etc.), smart appliances, gaming or entertainment consoles and set top boxes, among other examples.

Figure 9:
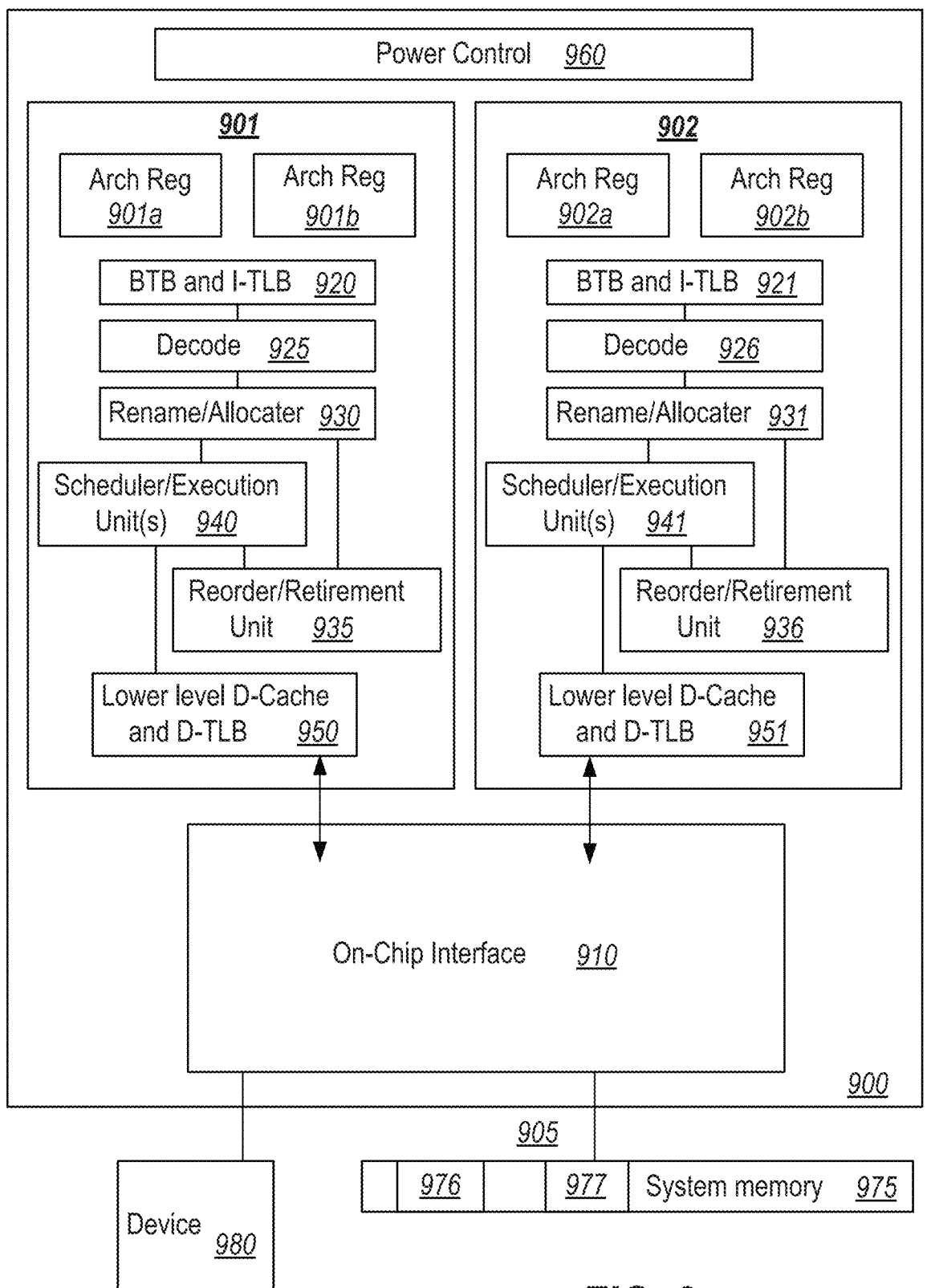
FIG. 9 illustrates an embodiment of a block diagram for a computing system including a multicore processor.

For instance, referring to FIG. 9, an embodiment of a block diagram for a computing system including a multicore processor is depicted. Processor 900 includes any processor or processing device, such as a microprocessor, an embedded processor, a digital signal processor (DSP), a network processor, a handheld processor, an application processor, a co-processor, a system on a chip (SOC), or other device to execute code. Processor 900, in one embodiment, includes at least two cores-core 901 and 902, which may include asymmetric cores or symmetric cores (the illustrated embodiment). However, processor 900 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 900, as illustrated in FIG. 9, includes two cores-core 901 and 902. Here, core 901 and 902 are considered symmetric cores, i.e. cores with the same configurations, functional units, and/or logic. In another embodiment, core 901 includes an out-of-order processor core, while core 902 includes an in-order processor core. However, cores 901 and 902 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 901 are described in further detail below, as the units in core 902 operate in a similar manner in the depicted embodiment.

As depicted, core 901 includes two hardware threads 901a and 901b, which may also be referred to as hardware thread slots 901a and 901b. Therefore, software entities, such as an operating system, in one embodiment potentially view processor 900 as four separate processors, i.e., four logical processors or processing elements capable of executing four software threads concurrently. As alluded to above, a first thread is associated with architecture state registers 901a, a second thread is associated with architecture state registers 901b, a third thread may be associated with architecture state registers 902a, and a fourth thread may be associated with architecture state registers 902b. Here, each of the architecture state registers (901a, 901b, 902a, and 902b) may be referred to as processing elements, thread slots, or thread units, as described above. As illustrated, architecture state registers 901a are replicated in architecture state registers 901b, so individual architecture states/contexts are capable of being stored for logical processor 901a and logical processor 901b. In core 901, other smaller resources, such as instruction pointers and renaming logic in allocator and renamer block 930 may also be replicated for threads 901a and 901b. Some resources, such as re-order buffers in reorder/retirement unit 935, ILTB 920, load/store buffers, and queues may be shared through partitioning. Other resources, such as general purpose internal registers, page-table base register(s), low-level data-cache and data-TLB 915, execution unit(s) 940, and portions of out-of-order unit 935 are potentially fully shared.

Processor 900 often includes other resources, which may be fully shared, shared through partitioning, or dedicated by/to processing elements. In FIG. 9, an embodiment of a purely exemplary processor with illustrative logical units/resources of a processor is illustrated. Note that a processor may include, or omit, any of these functional units, as well as include any other known functional units, logic, or firmware not depicted. As illustrated, core 901 includes a simplified, representative out-of-order (OOO) processor core. But an in-order processor may be utilized in different embodiments. The OOO core includes a branch target buffer 920 to predict branches to be executed/taken and an instruction-translation buffer (I-TLB) 920 to store address translation entries for instructions.

Core 901 further includes decode module 925 coupled to fetch unit 920 to decode fetched elements. Fetch logic, in one embodiment, includes individual sequencers associated with thread slots 901a, 901b, respectively. Usually core 901 is associated with a first ISA, which defines/specifies instructions executable on processor 900. Often machine code instructions that are part of the first ISA include a portion of the instruction (referred to as an opcode), which references/specifies an instruction or operation to be performed. Decode logic 925 includes circuitry that recognizes these instructions from their opcodes and passes the decoded instructions on in the pipeline for processing as defined by the first ISA. For example, as discussed in more detail below decoders 925, in one embodiment, include logic designed or adapted to recognize specific instructions, such as transactional instruction. As a result of the recognition by decoders 925, the architecture or core 901 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 926, in one embodiment, recognize the same ISA (or a subset thereof). Alternatively, in a heterogeneous core environment, decoders 926 recognize a second ISA (either a subset of the first ISA or a distinct ISA).

In one example, allocator and renamer block 930 includes an allocator to reserve resources, such as register files to store instruction processing results. However, threads 901a and 901b are potentially capable of out-of-order execution, where allocator and renamer block 930 also reserves other resources, such as reorder buffers to track instruction results. Unit 930 may also include a register renamer to rename program/instruction reference registers to other registers internal to processor 900. Reorder/retirement unit 935 includes components, such as the reorder buffers mentioned above, load buffers, and store buffers, to support out-of-order execution and later in-order retirement of instructions executed out-of-order.

Scheduler and execution unit(s) block 940, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 950 are coupled to execution unit(s) 940. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 901 and 902 share access to higher-level or further-out cache, such as a second level cache associated with on-chip interface 910. Note that higher-level or further-out refers to cache levels increasing or getting further way from the execution unit(s). In one embodiment, higher-level cache is a last-level data cache—last cache in the memory hierarchy on processor 900—such as a second or third level data cache. However, higher level cache is not so limited, as it may be associated with or include an instruction cache. A trace cache—a type of instruction cache—instead may be coupled after decoder 925 to store recently decoded traces. Here, an instruction potentially refers to a macro-instruction (i.e. a general instruction recognized by the decoders), which may decode into a number of micro-instructions (micro-operations).

In the depicted configuration, processor 900 also includes on-chip interface module 910. Historically, a memory controller, which is described in more detail below, has been included in a computing system external to processor 900. In this scenario, on-chip interface 910 is to communicate with devices external to processor 900, such as system memory 975, a chipset (often including a memory controller hub to connect to memory 975 and an I/O controller hub to connect peripheral devices), a memory controller hub, a northbridge, or other integrated circuit. And in this scenario, bus 905 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 975 may be dedicated to processor 900 or shared with other devices in a system. Common examples of types of memory 975 include DRAM, SRAM, non-volatile memory (NV memory), and other known storage devices. Note that device 980 may include a graphic accelerator, processor or card coupled to a memory controller hub, data storage coupled to an I/O controller hub, a wireless transceiver, a flash device, an audio controller, a network controller, or other known device. The device 980 may have a conventional single uplink port design, or may be provided with multiple uplink ports, such as in the examples above.

Recently however, as more logic and devices are being integrated on a single die, such as SOC, each of these devices may be incorporated on processor 900. For example in one embodiment, a memory controller hub is on the same package and/or die with processor 900. Here, a portion of the core (an on-core portion) 910 includes one or more controller(s) for interfacing with other devices such as memory 975 or a device 980. The configuration including an interconnect and controllers for interfacing with such devices is often referred to as an on-core (or un-core configuration). As an example, on-chip interface 910 includes a ring interconnect for on-chip communication and a high-speed serial point-to-point link 905 for off-chip communication. Yet, in the SOC environment, even more devices, such as the network interface, co-processors, memory 975, device 980, and any other known computer devices/interface may be integrated on a single die or integrated circuit to provide small form factor with high functionality and low power consumption.

In one embodiment, processor 900 is capable of executing a compiler, optimization, and/or translator code 977 to compile, translate, and/or optimize application code 976 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 10:
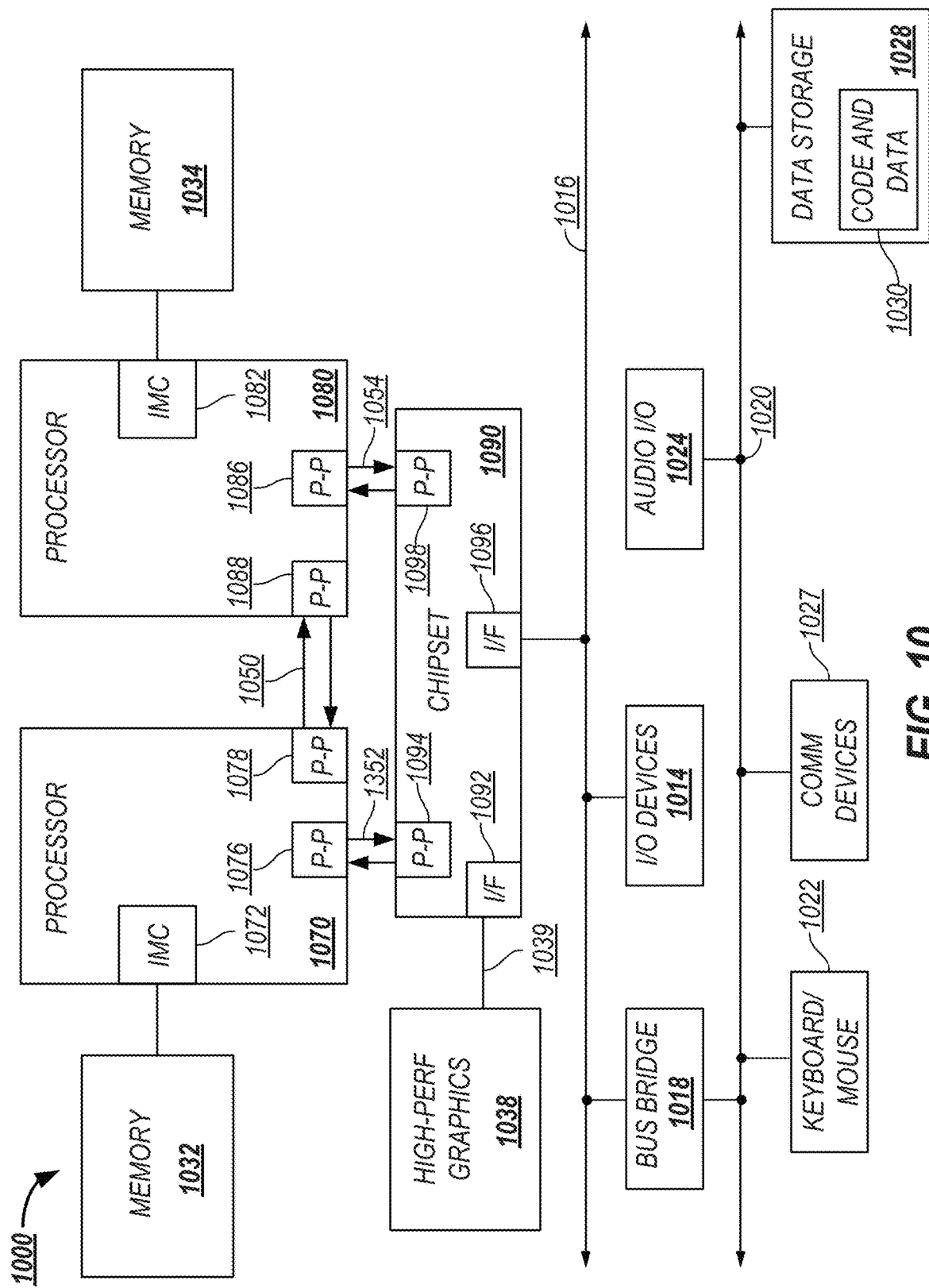
FIG. 10 illustrates an embodiment of a block for a computing system including multiple processor sockets.

Referring now to FIG. 10, shown is a block diagram of a second system 1000 in accordance with an embodiment of the present disclosure. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of a processor. In one embodiment, 1052 and 1054 are part of a serial, point-to-point coherent interconnect fabric, such as a high-performance architecture. As a result, the concepts described herein may be implemented within the UPI architecture.

While shown with only two processors 1070, 1080, it is to be understood that the scope of the present disclosure is not so limited. In other embodiments, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 each exchange information with a chipset 1090 via individual P-P interfaces 1052, 1054 using point to point interface circuits 1076, 1094, 1086, 1098. Chipset 1090 may be connected to one or more devices (including to devices having multiple uplink ports), such as a high-performance graphics circuit 1038, and exchanges information with such devices via link enabled by an interface circuit 1092 along a high-performance interconnect 1039, among other examples.

A shared cache (not shown) may be included in either processor or outside of both processors; yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 are coupled to first bus 1016, along with a bus bridge 1018 which couples first bus 1016 to a second bus 1020. In one embodiment, second bus 1020 includes a low pin count (LPC) bus. Various devices are coupled to second bus 1020 including, for example, a keyboard and/or mouse 1022, communication devices 1027 and a storage unit 1028 such as a disk drive or other mass storage device which often includes instructions/code and data 1030, in one embodiment. Further, an audio I/O 1024 is shown coupled to second bus 1020. Note that other architectures are possible, where the included components and interconnect architectures vary. For example, instead of the point-to-point architecture of FIG. 10, a system may implement a multi-drop bus or other such architecture.

While the concepts herein have been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Aspects of the embodiments can include one or a combination of the following examples:

Example 1 is an apparatus including a device including two or more uplink ports to connect the device via two or more links to one or more sockets, where each of the sockets includes one or more processing cores, and each of the two or more links is compliant with a particular interconnect protocol. The apparatus can further include I/O logic to identify data to be sent to the one or more processing cores for processing, determine an affinity attribute associated with the data, and determine which of the two or more links to use to send the data to the one or more processing cores based on the affinity attribute. The I/O logic may be incorporated in the device.

Example 2 may include the subject matter of example 1, where the one or more sockets include two or more sockets, and the two or more uplink ports each connect to a respective one of two or more sockets.

Example 3 may include the subject matter of example 2, where the apparatus further includes partition logic to present the device as two or more logical device instances to the two or more sockets, where each of the logical device instances corresponds to a respective one of the two or more sockets and connect via a respective one of the two or more uplink ports.

Example 4 may include the subject matter of example 3, where the partition logic is to selectively enable partitioning of the device into the two or more logical device instances.

Example 5 may include the subject matter of any one of examples 1-4, where the particular interconnect protocol is adapted for devices with a single uplink port.

Example 6 may include the subject matter of any one of examples 1-5, where the I/O logic is further to identify a request received at the device, the data is to be sent in response to the request, and the affinity attribute corresponds to the request.

Example 7 may include the subject matter of example 6, where the affinity attribute includes a requester identifier, the I/O logic is further to identify that a particular one of the two or more uplink ports corresponds to the requester identifier, and send the data on the particular uplink port based on the requester identifier.

Example 8 may include the subject matter of example 7, where the requester identifier identifies a particular one of the processing cores.

Example 9 may include the subject matter of example 6, where the request is received on a particular one of the two or more uplink ports, and the data is to be sent on the particular uplink port based on the request being received on the particular uplink port.

Example 10 may include the subject matter of example 6, where the request includes a work descriptor from a driver of the device, the affinity attribute includes a hint inserted in the work descriptor by the driver, and the I/O logic is to determine that the data is to be sent on a particular one of the two or more uplink ports based on the hint.

Example 11 may include the subject matter of any one of examples 1-10, where the two or more uplink ports are to connect to a single socket connected by two or more links.

Example 12 may include the subject matter of any one of examples 1-11, further including power management logic to determine a link state transition to a particular power state for a particular one of the two or more links corresponding to sending of the data, and cause another one of the two or more links to also transition to the particular power state based on the link state transition of the particular link.

Example 13 may include the subject matter of any one of examples 1-12, where the particular interconnect protocol includes a Peripheral Component Interconnect Express (PCIe)-based protocol.

Example 14 may include the subject matter of any one of examples 1-13, where the device includes a PCIe-compliant device.

Example 15 is a system including memory, a processor, an operating system, a first instance of a particular driver, where the particular driver is for a device type and the first instance of the particular driver is assigned to a first interconnect link to connect the processor to a particular instance of the device, and a second instance of the particular driver, where the second instance of the particular driver is assigned to a second interconnect link to connect the processor to the particular instance of the device, where the particular instance of the device includes two or more uplink ports, the first instance of the particular driver is designated as a principal instance, and the operating system communicates with the particular instance of the device using the first instance of the particular driver.

Example 16 may include the subject matter of example 15, where the processor includes a plurality of sockets, each of the plurality of sockets includes one or more processing cores, the first interconnect link connects the particular instance of the device to a first one of the plurality of sockets, and the second interconnect link connects the particular instance of the device to a second one of the plurality of sockets.

Example 17 may include the subject matter of any one of examples 15-16, where the first instance of the particular driver is to determine that a work request corresponds to a particular one of the plurality of sockets, append a hint to the work request to identify that data generated by the particular instance of the device for the work request is to be sent on a particular one of the two or more uplink ports, and send the work request with the hint to the particular instance of the device.

Example 18 is a system including a processor including a plurality of sockets, where each socket includes one or more processing cores and the plurality of sockets are interconnected by one or more interprocessor links. The system may further include a particular device including two or more uplink ports to connect the particular device via two or more links to two or more of the plurality of sockets, where each of the two or more links is compliant with a particular interconnect protocol. The particular device may include port policy logic to identify data to be sent to the processor for processing and determine which of the two or more links to use to send the data according to one or more policies, where the one or more policies are to attempt to minimize routing of the data over the one or more interprocessor links.

Example 19 may include the subject matter of example 18, where each of the plurality of sockets is connected to a respective local memory block, the data includes a write request to a particular one of the local memory blocks, and the policy is to attempt to direct the data to a particular one of the two or more links connecting the particular device to the socket directly connected to the particular local memory block.

Example 20 may include the subject matter of any one of examples 18-19, further including another device including a single uplink port, where the other device connects to a particular one of the sockets via a link.

Example 21 may include the subject matter of any one of examples 18-20, further including an operating system and one or more drivers for the particular device.

Example 22 may include the subject matter of any one of examples 18-21, where the particular interconnect protocol includes a Peripheral Component Interconnect Express (PCIe)-based protocol and the one or more interprocessor links use an UltraPath Interconnect (UPI)-based protocol.

Example 23 is a method including identifying data to be sent to a processor by a device, where the processor includes a plurality of sockets, each of the plurality of sockets includes one or more processing cores, the device includes two or more uplink ports connecting the device to two or more of the plurality of sockets via two or more respective links, and each of the two or more links is compliant with a particular interconnect protocol, determining an affinity attribute associated with the data, determining a particular one of the two or more links to use to send the data to the one or more processing cores based on the affinity attribute, and sending the data to the processor using a particular one of the two or more uplink ports corresponding to the particular link.

Example 24 may include the subject matter of example 23, where the particular interconnect protocol is adapted for devices with a single uplink port.

Example 25 may include the subject matter of any one of examples 23-24, further including receiving a request at the device, where the data is to be sent in response to the request, and the affinity attribute corresponds to the request.

Example 26 may include the subject matter of example 25, where the affinity attribute includes a requester identifier, and determining the particular link includes determining that the particular link corresponds to the requester identifier.

Example 27 may include the subject matter of example 26, where the requester identifier identifies a particular one of the processing cores.

Example 28 may include the subject matter of example 25, where the request is received on the particular uplink port, and the data is to be sent on the particular uplink port based on the request being received on the particular uplink port.

Example 29 may include the subject matter of example 25, where the request includes a work descriptor from a driver of the device, the affinity attribute includes a hint inserted in the work descriptor by the driver, and the data is determined to be sent on a particular one of the two or more uplink ports based on the hint.

Example 30 may include the subject matter of any one of examples 23-29, where the two or more uplink ports are to connect to a single socket connected by two or more links.

Example 31 may include the subject matter of any one of examples 23-30, further including determining a link state transition to a particular power state for a particular one of the two or more links corresponding to sending of the data, and causing another one of the two or more links to also transition to the particular power state based on the link state transition of the particular link.

Example 32 may include the subject matter of any one of examples 23-31, where the particular interconnect protocol includes a Peripheral Component Interconnect Express (PCIe)-based protocol.

Example 33 may include the subject matter of any one of examples 23-32, where the device includes a PCIe-compliant device.

Example 34 is a system including means to perform the method of any one of examples 23-33.

Example 35 may include the subject matter of example 34, where the means include a computer readable medium with instructions stored thereon, and the instructions are executable by a machine to cause the machine to perform steps corresponding to any one of the examples 23-33.

Example 36 may include the subject matter of example 35, where the machine includes a processor of the device.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a network adapter comprising:

a first Peripheral Component Interconnect Express (PCIe) port, wherein the first PCIe port comprises first protocol circuitry to implement a first multi-lane link compliant with a PCIe-based protocol, the first multi-lane link comprises a number of lanes, and the number of lanes comprises at least eight lanes; and a second PCIe port, wherein the second PCIe port comprises second protocol circuitry to implement a second multi-lane link compliant with the PCIe-based protocol and the second multi-lane link comprises at least eight lanes, wherein the first and second PCIe ports are to connect the network adapter to one or more computing devices, the first PCIe port connects the network adapter to a first processor socket of the one or more computing devices via the first multi-lane link, and the second PCIe port connects the network adapter to a second processor socket of the one or more computing devices via the second multi-lane link; and network interface controller (NIC) circuitry to determine whether data from a network is to be sent on the first PCIe port or the second PCIe port based on attributes of the data to reduce traffic from the network across an internal bus coupling the first processor socket with the second processor socket.

2. The apparatus of claim 1, wherein the NIC circuitry is to identify the attributes of the data.

3. The apparatus of claim 1, wherein the network adapter further comprises a third port to couple to the network over a non-PCIe channel.

4. The apparatus of claim 3, wherein the third port is to couple to the network via Ethernet.

5. The apparatus of claim 3, wherein the third port is the only port of the apparatus to couple to the network.

6. The apparatus of claim 1, wherein the first PCIe port comprises sixteen lanes and the second PCIe port comprises sixteen lanes.

7. The apparatus of claim 1, wherein the one or more computing device comprise a particular computing device and the first and second sockets are sockets of the same particular computing device.

8. The apparatus of claim 1, wherein the first socket is on a first one of the one or more computing devices, and the second socket is on a separate second one of the or more computing devices.

9. The apparatus of claim 1, wherein the PCIe-based protocol comprises a PCIe Generation 3 protocol and each of the first and second PCIe ports supports a data rate of 8 gigatransfers/second (GT/s).

10. The apparatus of claim 1, wherein the PCIe-based protocol comprises a PCIe Generation 4 protocol and each of the first and second PCIe ports supports a data rate of 16 GT/s.

11. A method comprising:
receiving, at a particular port of a network adapter, data from a network, wherein the data is received at the particular port over a non-Peripheral Component Interconnect Express (PCIe) channel, the network adapter comprises a first PCIe port to implement a first PCIe link comprising eight or more lanes and a second PCIe port to implement second link comprising eight or more lanes, the first PCIe link couples the network adapter to a first socket, and the second PCIe link couples the network adapter to a second socket;

determining, at network interface controller (NIC) circuitry of the network adapter, whether to send the data over a selected one of the first PCIe port or the second PCIe port based on attributes of the data; and sending the data over the selected PCIe port to mitigate data from the network traversing an internal bus coupling the first socket with the second socket.

12. The method of claim 11, wherein the particular port couples to the network via Ethernet.

13. The method of claim 11, wherein the first socket and the second socket are on the same board.

14. The method of claim 11, wherein the particular port is the sole connection of the network adapter to the network.

15. A system comprising:
a first socket associated with a first processor device;
a second socket associated with a second processor device, wherein the first processor device is coupled to the second processor device by a bus; and
a network adapter comprising:
a first Peripheral Component Interconnect Express (PCIe) port, wherein the first PCIe port comprises first protocol circuitry to implement a first multi-lane link compliant with a PCIe-based protocol, and the first multi-lane link comprises at least eight physical lanes; and a second PCIe port, wherein the second PCIe port comprises second protocol circuitry to implement a second multi-lane link compliant with the PCIe-based protocol, and the second multi-lane link comprises at least eight physical lanes, wherein the first and second PCIe ports connect the network adapter to one or more computing devices, the first PCIe port connects the network adapter to the first socket of the one or more computing devices via the first multi-lane link, and the second PCIe port connects the network adapter to the second socket of the one or more computing devices via the second multi-lane link; and network interface controller (NIC) circuitry to determine whether data from a network is to be sent on the first PCIe port or the second PCIe port based on attributes of the data to mitigate data from the network traversing the bus between the first processor device and the second processor device.

16. The system of claim 15, wherein the network adapter comprises an Ethernet interface to couple to a network.

17. The system of claim 15, wherein the first socket and the second socket respectively connect the first processor and the second processor to a board.

18. The system of claim 15, wherein the bus coupling the first processor device and the second processor device comprises an inter-processor bus based on a non-PCIe interconnect protocol.

19. The system of claim 18, wherein the inter-processor bus is based on an UltraPath Interconnect (UPI) protocol.

20. The system of claim 15, further comprising a server, wherein the server comprises the first processor device, the second processor device, and the network adapter.

* * * * *